July 9, 1957 — G. V. CONSTANTAKIS — 2,798,376
APPARATUS FOR TESTING TIRES
Filed Oct. 12, 1954

INVENTOR.
GEORGE V. CONSTANTAKIS
BY Irwin M. Lewis
ATTORNEY.

United States Patent Office 2,798,376
Patented July 9, 1957

2,798,376

APPARATUS FOR TESTING TIRES

George V. Constantakis, Allen Park, Mich., assignor to United States Rubber Company, New York, N. Y., a corporation of New Jersey Application October 12, 1954, Serial No. 461,768

5 Claims. (Cl. 73—9)

This invention relates to apparatus for testing the traction properties of a tire tread on snow or ice.

The primary object of the invention is to provide a simple, inexpensive apparatus for testing the traction properties of a tire tread on snow, ice or mixtures thereof which will permit precise control of the test conditions including the formation and physical properties of the frozen surface, whether snow, ice or mixtures thereof, so as to provide accurate, reproducible and comparable test data.

It is also an object of the invention to provide such apparatus which is independent of availability of naturally formed snow or ice.

In practice of the invention, water in one or a mixture of its natural phases is deposited on the outer surface of a wheel and frozen by the application of a refrigerant to the inner surface of the wheel. Depending upon the phase or phases in which the water exists when applied to the surface of the wheel, the desired quality of the frozen water surface is obtained. The frozen water surface may be ice-like, either glazed or coarse or snow-like. For example, water applied in the liquid phase provides an ice-like surface and water applied in a vapor phase provides a snow-like surface. The wheel with the frozen surface of water thereon is rotated at a predetermined peripheral speed and the tread of the tire to be tested is pressed against the frozen layer of water under a predetermined load. The tire is braked against rotation and the frictional resistance between the frozen surface layer of water and the tread of the tire occasioned by the application of the tread of the braked tire to the frozen surface is measured. This resulting resistance is a measure of the traction properties of the tread which may be compared with that obtained in testing other tires in a like manner.

The preferred apparatus of the invention includes a rotatably mounted wheel having an outer peripheral rim surface which is covered by a layer of fabric. Means are provided adjacent the outer periphery of the wheel for applying water to the peripheral surface of the wheel and chambers are provided interior of the outer peripheral surface of the wheel for receiving a refrigerant for freezing the water applied thereto. The layer of fabric promotes the adhesion of the frozen water to the rim, and prevents cracking of the frozen water under the stresses imposed thereon when the tire is pressed thereagainst. A movable carriage for supporting the tire and for pressing the tire tread against the frozen surface of the wheel under a predetermined load is positioned adjacent the wheel. Suitable braking means are provided for braking the tire against rotation. A transversely movable device is mounted adjacent the wheel for trimming and smoothing the ice or snow formed on the surface of the wheel.

The apparatus of the present invention having been broadly described above, a more detailed description thereof is given hereafter by reference to the accompanying drawings wherein.

Figure 1:
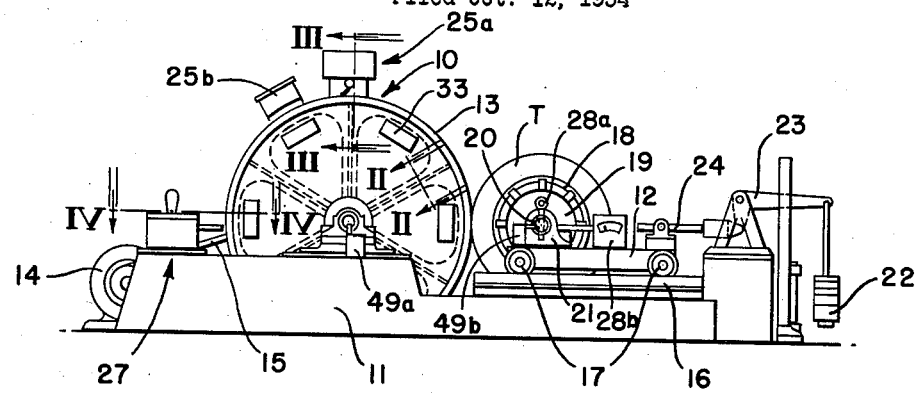
Fig. 1 is an elevational view of an embodiment of the apparatus of the present invention.

The apparatus of the present invention may be easily constructed by modifying existing tire testing equipment. The particular form of the apparatus shown in Fig. 1 illustrates such a modification of the tire testing machine disclosed in U. S. Patent No. 1,875,786.

The existing equipment broadly includes a spoked metal wheel 10, rotatably mounted on a base 11 and a tire supporting carriage 12 mounted for movement toward the outer cylindrical rim surface 13 of the wheel 10 to press the tread of a tire T carried thereby against the outer cylindrical rim surface 13 of the wheel 10.

The wheel 10 is adapted to be rotated by means of a suitable motor 14 through a belt 15 and carriage 12 is mounted for movement towards and away from the wheel 10 on tracks 16 by means of rollers 17. The tire T to be tested is mounted on a suitable rim 18 which in turn is supported on the carriage 12 by a chuck 19. Chuck 19 is secured to a shaft 20 which in turn is journaled in suitable bearings 21 secured to the carriage 12.

The force for moving the carriage 12 when pressing the tread of the tire T supported thereby against the surface 13 of the wheel 10 is supplied by means of weights 22 suspended from the longer arm of a pivotally mounted bell crank 23, the shorter arm of which is connected to the carriage 12 by a link 24.

The modifications constituting a part of the present invention includes, the enclosing of the spoked portion of the wheel 10 to provide a chamber for the reception of a refrigerant, such as solid carbon dioxide; the provision of a device, designated by the reference numeral 25a for supplying water in liquid phase to the rim surface of the wheel 10 or the provision of a vapor generator or similar device 25b for supplying water in a vapor phase to the rim surface of the wheel 10; the provision of a layer of fabric 26 secured to the rim surface 13 to promote adhesion between the frozen layer of water and the rim surface 13 and to prevent cracking of the frozen layer under stresses imposed by a tire pressed thereagainst; the provision of a device, generally designated by the reference numeral 27, for trimming and smoothing the layer of ice or snow formed on the surface of the wheel 10; and suitable braking means such as a pin or key 28a extending through shaft 20 and bearing 21 or a suitable power absorbing dynamometer 28b operatively connected to the shaft 20 for applying a braking force to the tire T. It will be appreciated that other types of braking devices may be used.

The enclosing of the spoked portion of the wheel is accomplished by securing side covers 29 and 30, preferably possessing insulating qualities, to each side of the wheel 10. The portion of the wheel 10 so enclosed is partitioned into six individual chambers by the provision of strips 31 which extend between and are secured to the spokes 32 of the wheel 10 and the side covers 29 and 30. Each chamber so formed is provided with a door 33 through which a refrigerant, such as solid carbon dioxide, may be introduced therein. The partitioning of the enclosed space into individual chambers minimizes the shfting of the refrigerant as the wheel is rotated.

The device 25a for applying water in a liquid phase to the rim of the wheel 10 may consist of a reservoir 35 mounted on a suitable framework 36 above the wheel 10 for holding a supply of water and a feeder 37 communicating with the reservoir 35 through small openings 38 and provided with additional small openings 39 through the bottom thereof through which water may drip on to the peripheral rim surface 13 of the wheel 10. A fabric wick 40 secured to the bottom of the feeder 37 and of a length to drag on the surface 13 of the wheel 10 serves to spread and distribute the water over the rim surface 13. A snow-like surface may be provided by producing water in the vapor phase adjacent the surface of the wheel 10 by means of a suitable water vapor generator, generally designated by the reference numeral 25b.

Figure 4:
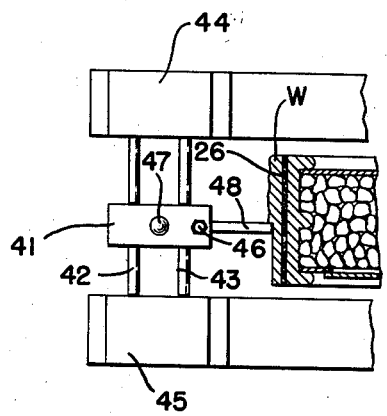
Fig. 4 is a sectional view taken on the line IV—IV of Fig. 1 showing the device for trimming and smoothing the layer of ice or snow formed on the peripheral surface of the wheel.

The trimming and smoothing device 27 includes, as best shown in Fig. 4, a tool holder 41 slidably mounted for transverse movement with respect to the surface of the wheel 10 on parallel rods 42 and 43. The rods 42 and 43 are secured at their ends to suitable brackets 44 and 45 which are in turn secured to base 11 on opposite side of the wheel 10 from the tire carriage 12. A tool 48 is adjustably secured in the tool holder 41 by a set screw 46 and a handle 47 secured to the tool holder 41 facilitates the manual movement of a tool 48 transversely of the rim surface of the wheel 10 to trim or smooth a layer of frozen water W as shown in Fig. 4.

A suitable cabinet (not shown) enclosing the wheel 10 and tire T to permit accurate control of the temperature and humidity of the surrounding air may be provided.

A suitable tachometer 49a, or a similar device, connected to the shaft of the wheel 10 may be provided for measuring the rotational speed of the wheel 10 and the rotational distance the surface of the wheel 10 moves in a given period of time. A similar tachometer 49b may be provided for measuring the rotational speed of the shaft 20 and the tire T carried thereon.

Figure 2:
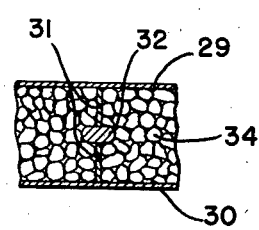
Fig. 2 is a sectional view taken along the line II—II of Fig. 1 showing the chamber construction of the test wheel for receiving the refrigerant showing crushed solid carbon dioxide carried therein for freezing the water applied to the outer peripheral surface of the wheel.
Figure 3:
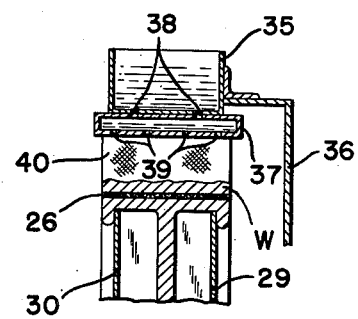
Fig. 3 is a sectional view taken along the line III—III of Fig. 1 showing the device for applying water to the peripheral surface of the wheel.

In utilizing the apparatus of the present invention, each of the chambers of the enclosed spoked portion of the wheel 10 is packed with a refrigerant, such as the crushed solid carbon dioxide 34 shown in Figs. 2 and 4. The refrigerant is introduced into the chambers through the doors 33. The wheel 10 is then rotated by operation of the motor 14. Water in the desired phase or mixture of phases, is next applied to the moving surface of the wheel 10 and frozen by the refrigerant 34 contained in the closed section of the wheel. After a sufficient layer of ice or snow is built up on the surface of the wheel, the outer surface thereof may be trimmed and smoothed by moving the cutter 48 transversely of the surface of the wheel as shown in Fig. 4, or, depending on the test conditions desired, the snow layer may be compacted to desired density by rolling the tire T against the snow surface or the surface may be left rough.

With the wheel 10 turning at a predetermined known speed, the carriage 12 with the tire T mounted thereon either fully braked by the pin 28a or partially braked by the power absorbing dynamometer 28b, is allowed to move the tread of the tire T against the frozen layer on the rim surface 13 of the wheel 10 under the known load of the weights 22, and the frictional resistance between the braked tire and the frozen surface is measured.

In the case where the tire is fully braked by the pin 28a, the frictional resistance may be easily measured by simultaneously disengaging the motor 14 and measuring the decrease in rotational speed of the wheel 10 over a given period of time as measured by a stop watch or similar timing device or measuring the time it takes the wheel 10 to drop in speed to a predetermined value.

In the case where the tire is partially braked by the power absorbing dynamometer, the frictional resistance may be measured by the braking force applied by the dynamometer and correlating this braking force measurement with the measurements of rotational speeds of the tire T and wheel 10.

Either measurement of the frictional resistance will be a measure of the traction properties of the tire tread which may be compared with results obtained in testing other tires in the like manner.

From the above description, it can be seen that there is provided a simple and inexpensive apparatus for testing the traction properties of a tire tread on snow or ice. The apparatus can be readily constructed by modifying existing tire testing equipment.

While certain embodiments of the invention have been shown and described, it is to be understood that this is for the purpose of illustration only and that variations therein can be made without departing from the spirit and scope of the invention.

Having thus described my invention, what I claim and desire to protect by Letters Patent is:

1. Tire testing apparatus comprising, a wheel having an outer peripheral surface and chambers interior of said surface for receiving and holding a refrigerant for freezing water applied to said surface, means mounting said wheel for rotation about its axis, means for rotating said wheel, means positioned adjacent said wheel for applying water to said surface, means positioned adjacent said wheel for supporting a tire, means for moving said supporting means towards said surface to press the tread of said tire against frozen water on said surface, and means for braking rotation of said tire.

2. Tire testing apparatus comprising, a wheel having a cylindrical outer peripheral surface and chambers interior of said surface for receiving and holding a refrigerant for freezing water applied to said surface, means on the surface of said wheel for promoting adhesion of frozen water to said surface and for reinforcing water frozen on said surface, means mounting said wheel for rotation about its axis, means for rotating said wheel, means positioned adjacent said wheel for applying water to said surface, means positioned adjacent said wheel for supporting a tire, means for moving said tire supporting means towards said surface of said wheel to press the tread of said tire against a layer of frozen water on said surface under a predetermined load, and means for braking rotation of said tire.

3. Tire testing apparatus comprising, a wheel having a cylindrical outer peripheral surface and chambers interior of said surface for receiving and holding a refrigerant for freezing water applied to said surface, a layer of fabric secured to said surface to promote adhesion of frozen water to said surface and to reinforce water frozen on said surface, means mounting said wheel for rotation about its axis, means for rotating said wheel, means positioned adjacent said wheel for applying water to said surface, means positioned adjacent said wheel for trimming and smoothing water frozen on said surface by said refrigerant, means positioned adjacent said wheel for supporting a tire, means for moving said supporting means towards said surface to press the tread of said tire against water frozen on said surface under a predetermined load, and means for braking rotation of said tire.

4. Tire testing apparatus comprising, a wheel having an outer peripheral surface and chambers interior of said surface for receiving and holding a refrigerant for freezing water applied to said surface, means mounting said wheel for rotation about its axis, means for rotating said wheel, means positioned adjacent said wheel for applying water to said surface, means positioned adjacent said wheel for rotatably supporting a tire, means for moving said supporting means towards said surface to press the tread of said tire against frozen water on said surface, and means for braking rotation of said tire and for measuring the power transmitted from said wheel to said tire.

5. Tire testing apparatus comprising, a wheel having an outer peripheral surface and chambers interior of said surface for receiving and holding a refrigerant for freezing water applied to said surface, means mounting said wheel for rotation about its axis, means for rotating said wheel, means positioned adjacent said wheel for applying water to said surface, means positioned adjacent said wheel for rotatably supporting a tire, means for moving said supporting means towards said surface to press the tread of said tire against frozen water on said surface, and a power absorbing dynamometer connected to said means for rotatably supporting said tire.

References Cited in the file of this patent

UNITED STATES PATENTS

| | | |
|---|---|---|
| 1,713,753 | Eger | May 21, 1929 |
| 1,875,786 | Warner | Sept. 6, 1932 |
| 2,010,049 | Abbott et al. | Aug. 6, 1935 |
| 2,144,010 | Bennett | Jan. 17, 1939 |
| 2,428,736 | Casmire | Oct. 7, 1947 |

OTHER REFERENCES

Publication, pp. 246, 248, "Scientific American," April 1937.